US008583768B2

(12) United States Patent
Han et al.

(10) Patent No.: US 8,583,768 B2
(45) Date of Patent: Nov. 12, 2013

(54) WIRELESS SENSOR NETWORK AND MANAGEMENT METHOD FOR THE SAME

(75) Inventors: Soon Seob Han, Seoul (KR); Eui Jik Kim, Suwon-si (KR); Kang Young Moon, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 853 days.

(21) Appl. No.: 12/344,707

(22) Filed: Dec. 29, 2008

(65) Prior Publication Data

US 2009/0168678 A1 Jul. 2, 2009

(30) Foreign Application Priority Data

Dec. 27, 2007 (KR) .................. 10-2007-0138456

(51) Int. Cl.
*G06F 15/177* (2006.01)
*G06F 15/16* (2006.01)

(52) U.S. Cl.
USPC ............ 709/221; 709/220; 709/222; 709/230

(58) Field of Classification Search
USPC ........................................ 709/230, 220–222
See application file for complete search history.

(56) References Cited

U.S. PATENT DOCUMENTS

| 6,553,336 | B1 * | 4/2003 | Johnson et al. ............... 702/188 |
| 7,844,687 | B1 * | 11/2010 | Gelvin et al. ................. 709/220 |
| 7,940,716 | B2 * | 5/2011 | Twitchell, Jr. ................ 370/328 |
| 8,189,474 | B2 * | 5/2012 | Venkataraman et al. ..... 370/235 |
| 2002/0106997 | A1 * | 8/2002 | Barber et al. ................. 455/343 |
| 2007/0014264 | A1 * | 1/2007 | Davis ........................... 370/336 |
| 2007/0093991 | A1 * | 4/2007 | Hoogenboom ............... 702/188 |
| 2009/0086702 | A1 * | 4/2009 | Julian et al. .................. 370/345 |

OTHER PUBLICATIONS

Wei Liang, Haibin Yu, Peng Zeng, and Chang Che, BESM: A Balancing Energy-aware Sensor Management Protocol for Wireless Sensor Network, 2006, International Journal of Information Technology, vol. 12 No. 14, pp. 11-19.*

Jaekyu Cho, Gilsoo Kim, Taekyoung Kwon and Yanghee Choi, A Distributed Node Scheduling Protocol Considering Sensing Coverage in Wireless Sensor Networks, Sep. 30, 2007-Oct. 3, 2007, IEEE, Vehicular Technology Conference, 2007. VTC-2007 Fall. 2007 IEEE 66th, pp. 352-356.*

Shansi Ren, Qun Li, Haining Wang, Xin Chen, Xiaodong Zhang, Design and Analysis of Sensing Scheduling Algorithms under Partial Coverage for Object Detection in Sensor Networks, Mar. 2007, IEEE, IEEE Transactions on Parallel and Distributed Systems, vol. 18, No. 3, pp. 334-350.*

* cited by examiner

*Primary Examiner* — Hieu Hoang
(74) *Attorney, Agent, or Firm* — Cha & Reiter, LLC.

(57) ABSTRACT

A wireless sensor network and management method for same are disclosed. The wireless sensor network includes a plurality of nodes transitioning between a sleeping state, probing state, and working state. The management method enables the nodes to make a state transition according to sent and received messages.

17 Claims, 5 Drawing Sheets

WIRELESS SENSOR NETWORK AND MANAGEMENT METHOD FOR THE SAME

CLAIM OF PRIORITY

This application claims the benefit of the earlier filing date, under 35 U.S.C. §119(a), of that Korean patent application filed in the Korean Intellectual Property Office on Dec. 27, 2007 and assigned Serial No. 2007-0138456, the entire disclosure of which is hereby incorporated by reference.

BACKGROUND OF THE INVENTION

1. Field of the Invention

The present invention relates to a wireless sensor network and, more particularly, to a wireless sensor network having an extended lifetime through balanced energy consumption and to a management method for the same.

2. Description of the Related Art

A wireless sensor network includes sensor nodes having sensors to collect desired information through sensing, and a sink node to send the collected information one or more devices outside the sensor network.

Unlike existing networks for communication, wireless sensor networks aim to collect information at a distance, and are employed in various applications having scientific, medical, military, or commercial uses.

In general, a node in a wireless sensor network has to employ a small-sized battery because of size limitations. The smallness of a sensor node implies some physical constraints, and the battery size is the most serious constraint. Currently, a battery having a size usable in a sensor node cannot supply sufficient energy to the sensor node. To extend the service lifetime of a sensor network, it is necessary to develop a technique that can handle the distribution and use of battery power.

In a sensor network, a data item and/or event sensed by a sensor node is relayed between nodes toward a sink node. Hence, the energy capacity of each node may affect the lifetime of the whole network.

For example, when a node on a critical path receives data from a number of other nodes and forwards the received data to the sink node, the critical path node may experience rapid energy exhaustion and the usable life of critical path node may be shortened in comparison to other nodes. In this case, the entire network may become useless regardless of energy states of other nodes. Hence, to extend the lifetime of a sensor network, it is necessary to manage the sensor network so that all the nodes can evenly consume the available energy.

SUMMARY OF THE INVENTION

The present invention provides a wireless sensor network and management method of the network wherein all the nodes in the wireless sensor network consume substantially the same amount of the available energy to extend the lifetime each node and, consequently, the network.

In accordance with an exemplary embodiment of the present invention, there is provided a method of managing a wireless sensor network, including: forming a network of nodes, the nodes transitioning between a sleeping state, a probing state, and a working state; and making, by the nodes, a state transition according to sent and received messages.

Making a state transition may include sending, by a node in the probing state, a probe message to neighbor nodes, receiving a reply message from one of the neighbor nodes as a response to the probe message, making a transition to one of the sleeping state and the working state on the basis of the received reply message and making a transition to the working state when no reply message is received for a preset time duration.

The reply message may contain data on a remaining battery capacity of a neighbor node having sent the reply message. In making a transition to one of the sleeping state and the working state, the node in the probing state sends, when a difference value obtained by subtracting a remaining battery capacity of the neighbor node associated with the reply message from that of the node is greater than or equal to a threshold value, a sleep message to the associated neighbor node and makes a transition to the working state. When the difference value is less than the threshold value the node in the probing state makes a transition to the sleeping state.

The sleep message defines a sleep time corresponding to a product of the difference value and a preset time value, and forces a neighbor node receiving the sleep message to remain in the sleeping state for the sleep time.

Making a state transition may include receiving, by a node in the working state, a probe message from one of the neighbor nodes, sending a reply message containing data on a remaining battery capacity of the node as a response to the probe message and making, upon reception of a sleep message in response to the reply message, a transition to the sleeping state. The sleep message defines a sleep time corresponding to a product of a difference value obtained by subtracting a remaining battery capacity of the node from that of a node sending the sleep message and a preset time value, and forces a node receiving the sleep message to remain in the sleeping state for the sleep time.

Making a state transition may include making, by a node in the sleeping state, a transition to the probing state after a sleep time expires.

The nodes may have overlapping sensing ranges and transmission ranges.

In accordance with another exemplary embodiment of the present invention, there is provided a wireless sensor network including a plurality of nodes transitioning between a sleeping state, a probing state, and a working state, wherein the nodes make a state transition according to sent and received messages.

A node in the probing state may send a probe message requesting a response to neighbor nodes.

The node in the probing state makes, when a reply message is received from at least one of the neighbor nodes, a transition to one of the sleeping state and the working state on the basis of the received reply message. The reply message may contain data on a remaining battery capacity of a neighbor node having sent the reply message. The node in the probing state sends, when a difference value obtained by subtracting a remaining battery capacity of the neighbor node associated with the reply message from that of the node is greater than or equal to a threshold value, a sleep message to the associated neighbor node and makes a transition to the working state. The node in the probing state makes, when the difference value is less than the threshold value, a transition to the sleeping state.

The node in the probing state may make a transition to the working state when no reply message is received for a preset time duration.

The sleep message defines a sleep time corresponding to a product of the difference value and a preset time value, and forces a neighbor node receiving the sleep message to remain in the sleeping state for the sleep time.

A node in the working state, when a probe message is received from one of neighbor nodes, sends a reply message containing data on a remaining battery capacity of the node.

The node in the working state makes, upon reception of a sleep message as a response to the reply message, a transition to the sleeping state.

The sleep message defines a sleep time corresponding to a product of a difference value obtained by subtracting a remaining battery capacity of the node from that of a node sending the sleep message and a preset time value, and forces a node receiving the sleep message to remain in the sleeping state for the sleep time.

A node in the sleeping state may make a transition to the probing state after a sleep time expires.

The nodes may have overlapping sensing ranges and transmission ranges.

In a feature of the present invention, as described above, only necessary ones of the nodes having overlapping sensing ranges and transmission ranges are permitted to transition to the working state in an alternating manner. Hence, energy consumption is evenly distributed among nodes.

In addition, the sleep times of nodes are increased when differences between remaining battery capacities of the nodes are uneven, and the sleep times of nodes are reduced when differences between remaining battery capacities of the nodes are even. This enables energy differences between nodes to be kept substantially even resulting in the battery lifetimes of the nodes expire at almost the same time. Hence, failures in parts of the network can be prevented, and the lifetime of the network can be extended. Further, prediction of the network lifetime is made easy, facilitating network management.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

Figure 1:
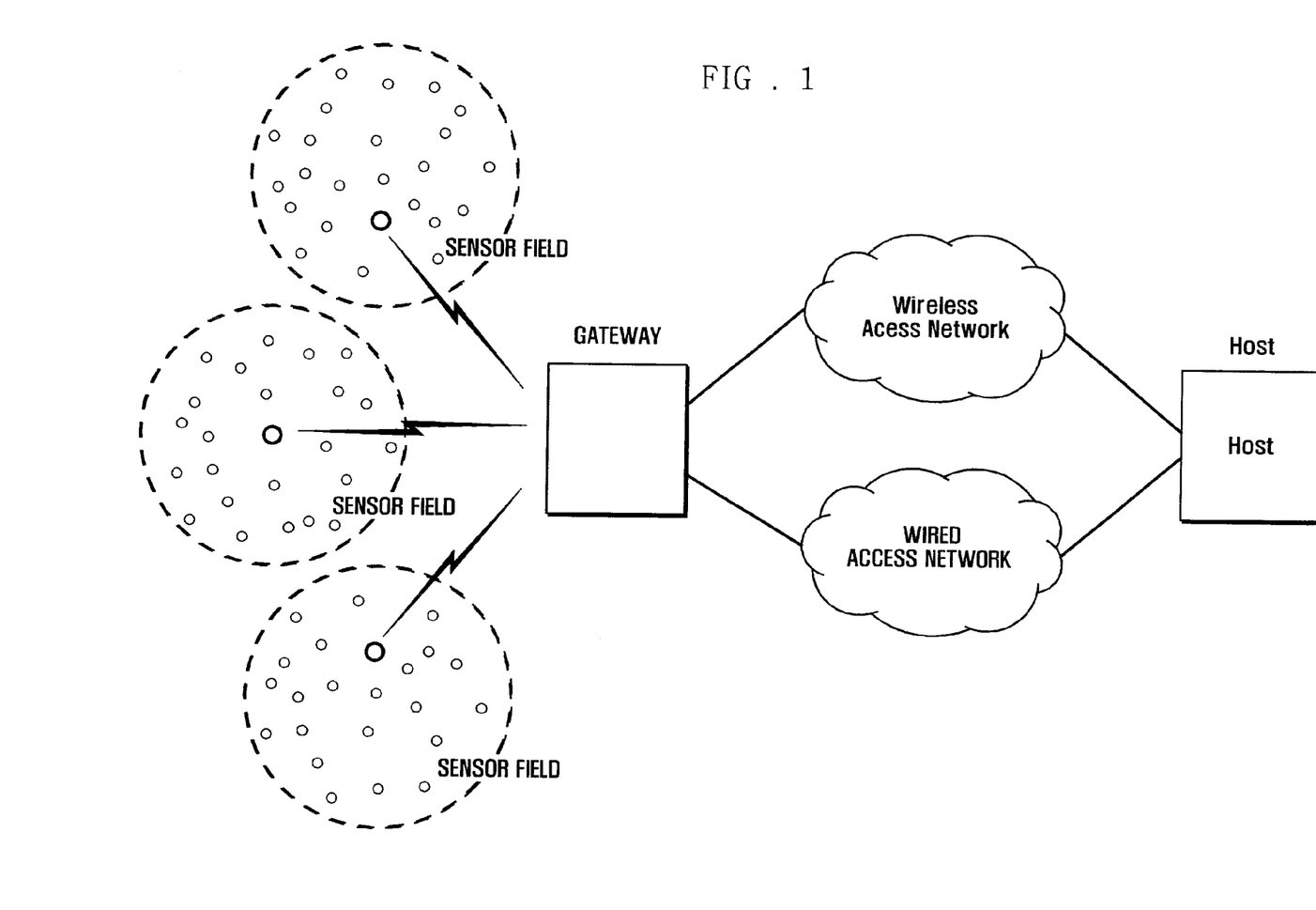
FIG. 1 illustrates a wireless sensor network according to an exemplary embodiment of the present invention.

FIG. 1 illustrates a wireless sensor network according to an exemplary embodiment of the present invention.

Referring to FIG. 1, in the wireless sensor network, two or more wireless sensor fields are connected though a gateway to an external network. Sensor nodes send data to a nearby sink node, and the sink node forwards the aggregated data to the gateway. The gateway sends the received data to a managing host through an access network. The access network can be based on existing infrastructure such as satellite communication, wired/wireless communication or the Internet, and may be a wireless access network or wired access network.

In a wireless sensor network ("sensor network" for short), a sensor field includes multiple nodes.

Each node is an ultra-small low-power device, typically having a small size (e.g., in the order of 1 $mm^3$). Each node includes a sensor to sense a piece of data, an analog-to-digital converter (ADC) to convert sensed data into a digital signal, a processor and memory to process and store data, a battery to supply power, and a wireless transceiver to send and receive data.

Nodes installed at a region or installed site form a network, and provide data of interest detected at the installed site to the user. These nodes can be divided by role into sink nodes and sensor nodes.

A sensor node senses a geographical or environmental change, such as temperature, humidity and atmospheric temperature at the installed site, and sends the sensed change to the sink node. Sensor nodes can be installed at specified sites or be randomly scattered in devices such as cars and airplanes. A sensor node is usually fixed at a preset site, and may be installed in a moving object such as a car, personal digital assistant, notebook or person and moved around.

A sink node manages sensor nodes in the sensor network, collects data sensed by the sensor nodes, and forwards the collected data to a gateway, which acts as a device for sending sensed data to the outside. A sensor network senses data of interest through sensor nodes installed within a particular region, collects the sensed data through a sink node, and provides the sensed data to the user through a gateway to an external network such as the Internet.

Because of size limitations, each node of the sensor network employs a small-sized battery. Hence, the node tends to undergo shortage of available energy. In the node, the wireless transceiver consumes power the most. For example, a narrow-band wireless transceiver with output power of 0 dBm at 3V consumes 15 mA in the transmission mode (TX) and 5 to 15 mA in the reception mode (RX). A spread spectrum wireless transceiver consumes more current in the reception mode than in the transmission mode.

This amount of current consumption is excessive for a sensor node. Hence, to save battery power, it is necessary to extend the inactive time of the wireless transceiver as much as possible. In a multi-hop wireless sensor network, nodes must cooperate together for sensor connectivity and traffic transportation. Turning off the wireless transceiver for a long time heightens the probability of packet loss or drop in a node, and may cause massive retransmission or even connection failure.

In a sensor network, nodes can be installed at specified sites or be randomly scattered. Nodes, installed at specified sites can be placed to have overlapping sensing ranges and transmission ranges. Similarly, nodes in cars and airplanes may move into ranges of nodes of specified sites such that an overlap of their sensing ranges and transmission ranges occurs. However, all the nodes with overlapping sensing ranges and transmission ranges do not have to sense and relay data at the same time.

In the present invention, for efficient use of energy, remaining energy capacities of nodes having overlapping sensing ranges and transmission ranges are compared with each other, and some of the nodes are allowed to sense and relay data and other nodes are made inactive. Thereto, each node can be in one of three states.

That is, a node can be in one of a probing state, a working state, and a sleeping state.

In the sleeping state, to save energy, power is minimally supplied in the node. The node includes a timer to manage the sleep time. The node remains in the sleep state for a preset time duration, i.e. sleep time $T_s$, and then transitions to the probing state.

In the probing state, the node, which awoke from the sleep state, sends a probe message to determine whether to transition to the working state or to transition back to the sleeping state.

In the working state, the node consumes the most energy to handle an assigned task. That is, the node can sense data through an equipped sensor, send the sensed data to the sink node, and/or relay data from another node.

Figure 2:
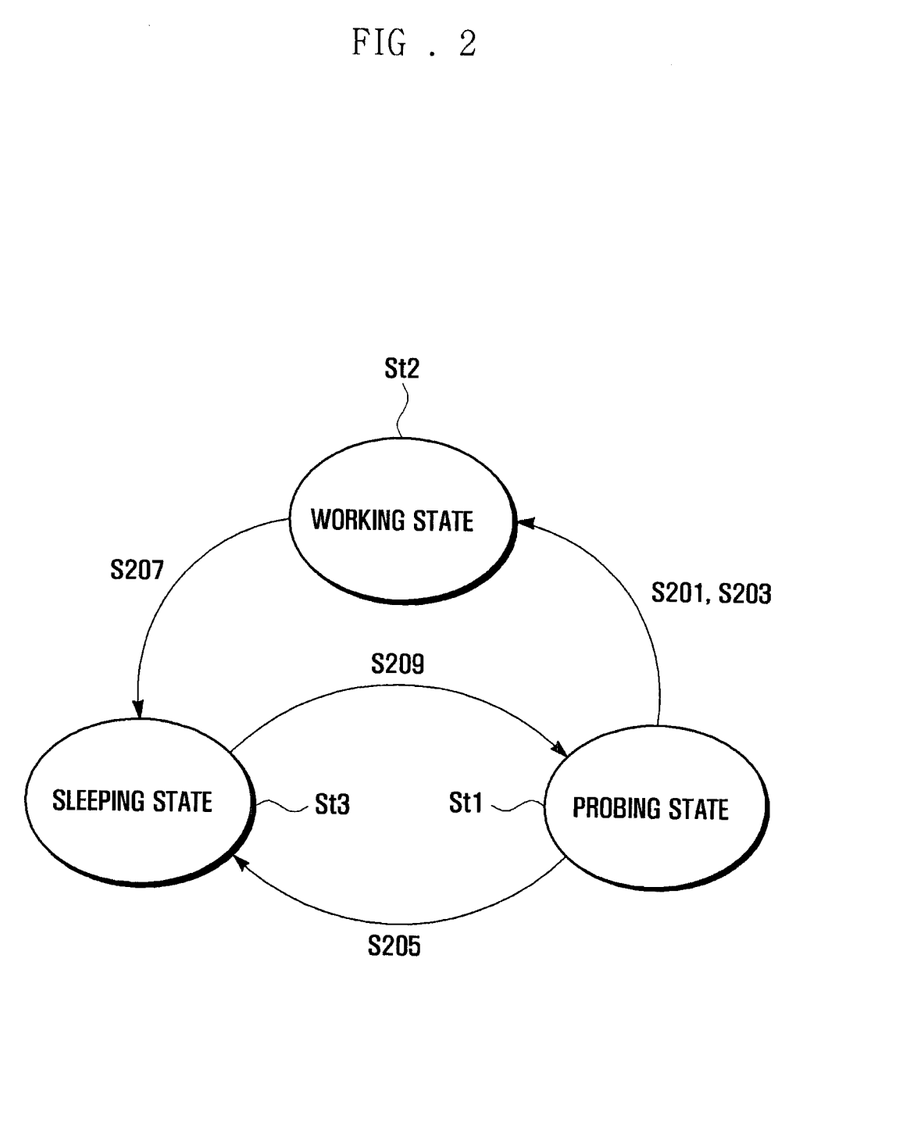
FIG. 2 illustrates a state transition diagram for a node.

In the present embodiment, a node exchanges messages with its neighbor nodes to make a state transition. FIG. 2 illustrates a state transition diagram for a node.

Referring to FIG. 2, a node can make a transition between three states: probing state St1, working state St2, and sleeping state St3.

In the probing state St1, a node checks the remaining battery capacity of a neighbor node. In the following description, it is assumed that a node A and node B are in the probing state St1 and working state St2, respectively.

The node A in the probing state St1 sends a probe message to neighbor nodes. Neighbor nodes in the working state St2 receive the probe message, and send a reply message in response to the probe message. The reply message contains data on the remaining battery capacity of the node.

Neighbor nodes not in the working state St2 cannot receive the probe message. Thus, when none of the neighbor nodes are in the working state St2, the node A cannot receive a reply message. If a reply message is not received after a preset time duration from the transmission of the probe message, the node A makes a transition to the working state St2 (S201).

However, upon receipt of a reply message, the node A compares its remaining battery capacity with that of the neighbor node (i.e., node B) sending the reply message. The comparison result can be represented by Equation 1 and Equation 2, where $P_r(A)$ and $P_r(B)$ denote remaining battery capacities of nodes A and B, respectively, and $P_{diff}$ denotes a preset threshold value.

A. $P_r(A)-P_r(B) \geq P_{diff}$     (1)

B. $P_r(A)-P_r(B) < P_{diff}$     (2)

That is, the difference value obtained by subtracting the remaining battery capacity of the node B from that of the node A can be greater than or equal to the threshold value as illustrated by Equation 1, or be less than the threshold value as illustrated by Equation 2.

If the difference value is greater than or equal to the threshold value (Equation 1), the node A sends a sleep message to the node B and makes a transition to the working state St2 (S203). If the difference value is less than the threshold value (Equation 2), the node A makes a transition to the sleeping state St3 (S205).

When two or more neighbor nodes in the working state St2 send a reply message, the node A computes a difference value by subtracting the remaining battery capacity of each of the neighbor nodes from that of the node A.

If any of the difference values is greater than or equal to the threshold value (Equation 1), the node A sends a sleep message to the neighbor node associated with the difference value greater than or equal to the threshold value, forcing the neighbor node receiving the sleep message to transition to the sleeping state St3. However, if any of the difference values is less than the threshold value (Equation 2), the node A makes a transition to the sleeping state St3 (S205).

In the working state St2, a node senses data of interest through a sensor and sends the sensed data. The node in the working state St2 can make a transition to the sleeping state St3. That is, upon reception of a sleep message from a neighbor node during the working state St2, the node can make a transition to the sleeping state St3 (S207).

As described above, two or more nodes send and receive a probe message and provide reply message so that their remaining battery capacities may be compared to the nodes sending the probe message. If the remaining battery capacity of a node sending a probe message is greater than that of a node sending a reply message (Equation 1), the node sending the probe message sends a sleep message to the node sending the reply message.

In the sleeping state St3, to save energy, power is minimally supplied in the node. When a node in the working state St2 receives a sleep message, the node makes a transition to the sleeping state St3 (S207). The sleep message indicates a sleep time, and the node remains in the sleeping state St3 for the sleep time. When the sleep time expires, the node makes a transition to the probing state St1 (S209). The sleep time can be set using Equation 3.

A. $T_s=(P_r(A)-P_r(B))\alpha$     (3)

In Equation 3, "$P_r(A)-P_r(B)$" denotes the difference between the remaining battery capacities of two nodes A and B, and $\alpha$ is a preset time value in seconds or milliseconds. According to Equation 3, a large difference between remaining battery capacities lengthens the sleep time, and a small difference shortens the sleep time. This is to prevent an increase in overhead due to too frequent transmission of probe messages. Accordingly, the present invention can contribute to balanced energy consumption between nodes.

When the sleep time $T_s$ expires, the node in the sleeping state St3 makes a transition to the probing state St1 (S209). The node, now in the probing state St1, sends a probe message to neighbor nodes. As described above, nodes make a transition between three states according to their remaining battery capacities, and energy consumption is evenly distributed between the nodes, thereby extending the lifetime of the sensor network.

Figure 3:
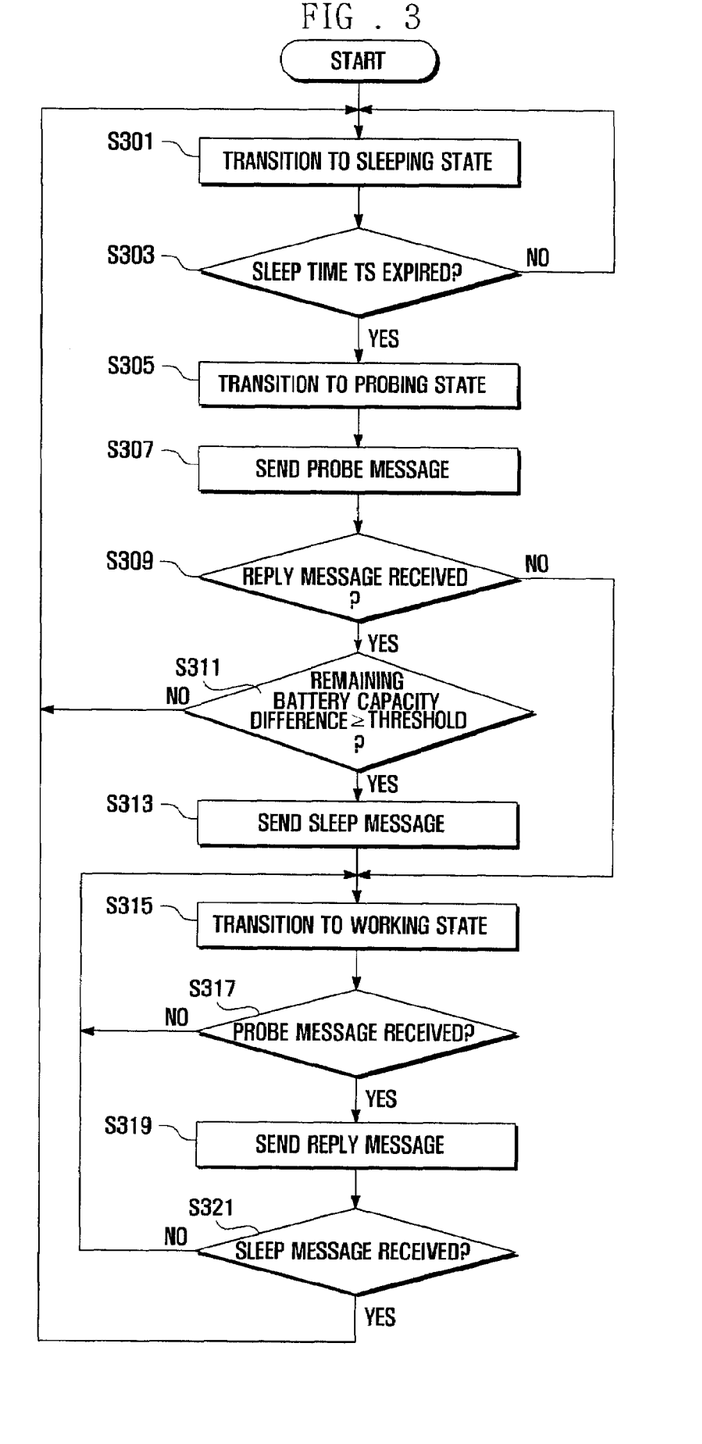
FIG. 3 is a flow chart illustrating a state transition procedure for a node according to another exemplary embodiment of the present invention.

FIG. 3 is a flow chart illustrating a state transition procedure for a node.

Referring to FIG. 3, a node is initially in the sleeping state (S301). The node in the sleeping state may have been previously the working state and received a sleep message indicating a sleep time $T_s$. The node remains in the sleeping state for the sleep time $T_s$. When the sleep time $T_s$ expires (S303), the node transitions to the probing state (S305). The node, now in the probing state, sends a probe message to neighbor nodes (S307).

If a neighbor node is in the working state, it will send a reply message in response to the probe message. If no neighbor node is in the working state, a reply message will not be received. After sending a probe message, the node waits for a preset time duration for a reply message. (S309) If a reply message is not received for the present time duration, it is assumed that no neighbor node is in the working state and the node makes a transition to the working state (S315).

However, if a reply message is received, the node calculates a difference value by subtracting the remaining battery capacity of the neighbor node associated with the reply message from that of the node sending the probe message, and determines whether the difference value is greater than or equal to a threshold value (S311).

If the difference value is greater than or equal to the threshold value, the node sends a sleep message to the neighbor node associated with the reply message (S313), and makes a transition to the working state (S315). If the difference value is less than the threshold value, the node makes a transition to the sleeping state (S301).

During the working state, the node checks whether a probe message is received (S317). If a probe message is received, the node sends a corresponding reply message (S319).

After sending a reply message, the node checks whether a sleep message is received (S321). If a sleep message is received, the node makes a transition to the sleeping state (S301). If a sleep message is not received, the node remains in the working state. The node continues to make a transition between the states until the energy or battery is exhausted.

Figure 4:
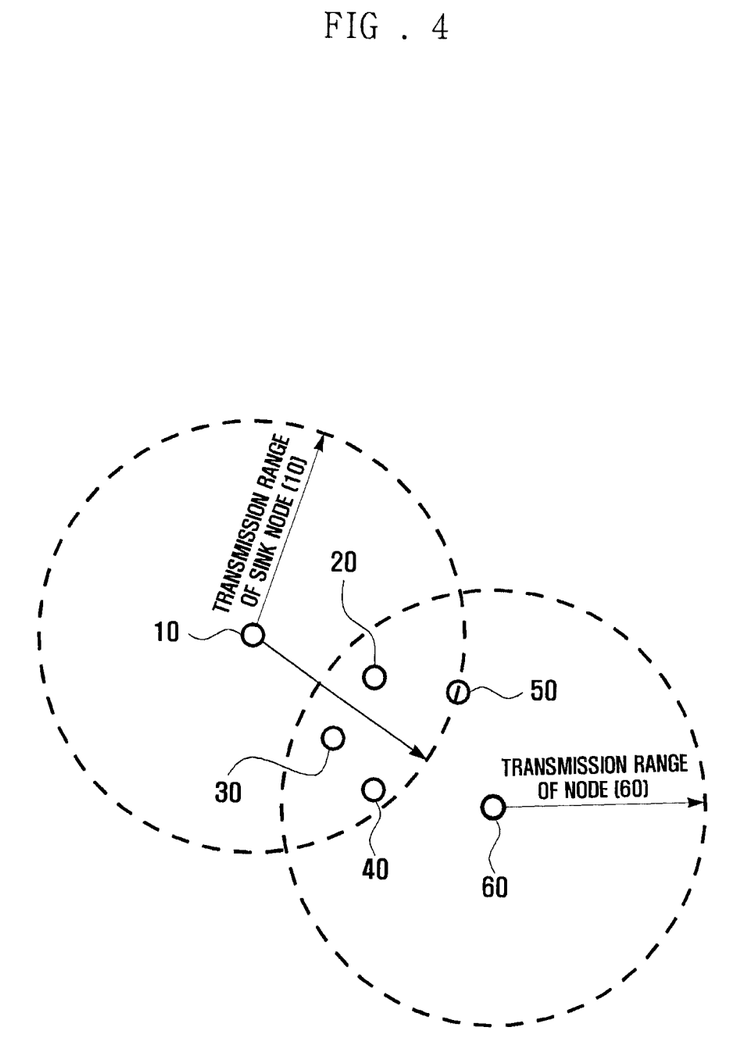
FIG. 4 illustrates a topology of a wireless sensor network.
Figure 5:
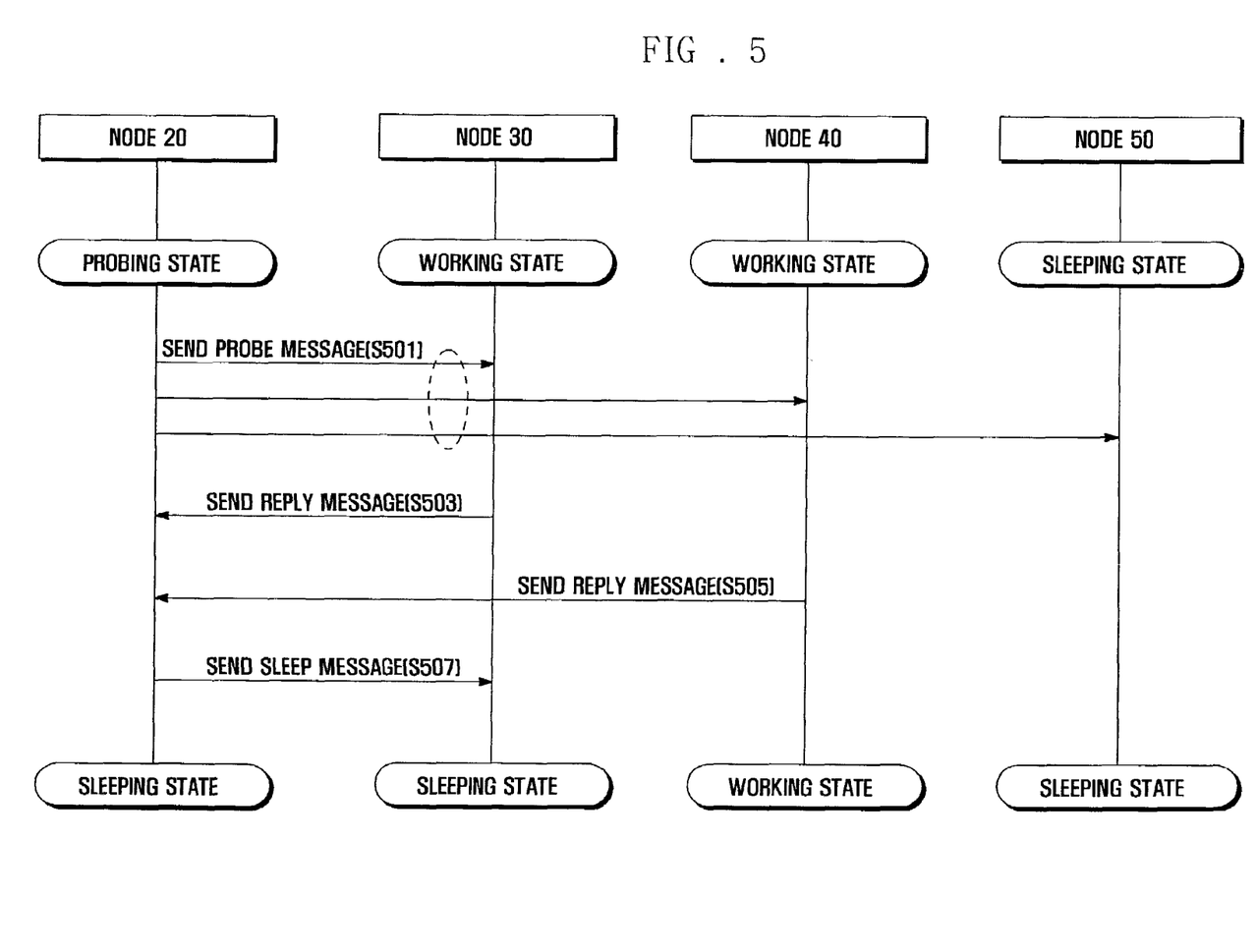
FIG. 5 is a sequence diagram illustrating message exchange between nodes having overlapping sensing ranges and transmission ranges for state transitions.

Next, a description is given of state transitions of plural nodes having overlapping sensing ranges and transmission ranges. FIG. 4 illustrates an exemplary topology of a wireless sensor network. FIG. 5 is a sequence diagram illustrating message exchange between nodes having overlapping sensing ranges and transmission ranges.

In FIG. 4, reference numeral 10 denotes a sink node, and reference numerals 20 to 60 denote sensor nodes. For the sake of simplicity, all the nodes have transmission ranges of the same radius. However, it would be understood that this simplification is merely to describe the inventive concept, which is applicable to nodes having different transmission and/or sensing ranges. The nodes 20 to 50 are in the transmission ranges of the sink node 10 and node 60. The sink node 10 is not in the transmission range of the node 60 and vice versa. Hence, in order for the node 60 to send sensed data to the sink node 10, it is necessary for one of the nodes 20 to 50 to relay the sensed data. However, not all the nodes 20 to 50 need relay the sensed data. In the present embodiment, energy consumption is evenly distributed between the nodes 20 to 50 to extend the lifetime. This approach is described in connection with FIG. 5.

In FIG. 5, it is assumed that the node 20 is in the probing state, the node 30 and node 40 are in the working state, and the node 50 is in the sleeping state. That is, a network is composed of plural nodes in the sleeping, probing, or working state.

The node 20 in the probing state sends a probe message to the nodes 30, 40 and 50. Preferably, the probe message is sent through a broadcast message. When multicasting is supported by the MAC and physical layers, the probe message can be sent to the nodes 30, 40 and 50 through multicasting.

The nodes 30 and 40 in the working state respond to the probe message, and the node 50 in the sleeping state does not respond to the probe message. Thus, the node 30 sends a reply message to the node 20 (S503), and the node 40 sends a reply message to the node 20 (S505).

For each received reply message, the node 20 calculates a difference value by subtracting the remaining battery capacity contained in the reply messages from that of the node 20.

That is, the node 20 calculates a difference value by subtracting the remaining battery capacity of a node having sent a reply message from the remaining battery capacity of the node 20. If the difference value is greater than or equal to the threshold value, the node 20 sends a sleep message to the node associated with the reply message. If the difference value is less than the threshold value, the node 20 makes a transition to the sleeping state. The sleep message includes a sleep time determined based on the difference in remaining battery capacity and a predetermined time. If the difference value is less than the threshold value, the node 20 makes a transition to the sleeping state and remains in the sleeping state for a time period (sleep time) based on the absolute difference in remaining battery capacity and a predetermined time.

Assuming for the sake of describing the principles of the invention that the difference value between the node 20 and node 30 is greater than or equal to the threshold value (Equation 1), and the difference value between the node 20 and node 40 is less than the threshold value (Equation 2), then node 20 sends a sleep message to the node 30 (S507), and then makes a transition to the sleeping state. Hence, node 40 remains in the active state. On the other hand, if the difference value between the node 20 and node 30 is greater than or equal to the threshold value and the difference value between the node 20 and node 40 is also greater than or equal to the threshold value, then sleep messages are sent to each of node 30 and 40, and node 20 transitions to a working state.

As described above, only a necessary one of those nodes having overlapping sensing ranges and transmission makes a transition to the working state. Transitions to the working state are made by multiple nodes in an alternating manner.

In particular, the sleep time is increased when the difference between remaining battery capacities is large, and is decreased when the difference is small. This contributes to balanced energy consumption between nodes during the lifetime of the network. In other words, the battery lifetimes of the nodes expire at almost the same time.

Hence, failures in parts of the network caused by the excessive use of one sensor can be prevented. Further, prediction of the network lifetime is made easy, facilitating network management.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method of managing a wireless sensor network, comprising:

forming a network of nodes, the nodes transitioning between one of a sleeping state, probing state, and working state;

sending, by one of said nodes in the probing state, a probe message to neighbor nodes;

receiving a reply message from one of the neighbor nodes in response to the probe message, said reply message including a battery capacity of the one of the neighbor nodes;

determining a difference between a remaining battery capacity of the neighbor node associated with the reply message and a battery capacity of the node in the probing state;

determining a sleep time corresponding to a product of the difference between the remaining battery capacity of the neighbor node associated with the reply message and the battery capacity of the node in the probing state and a preset value; and transitioning to one of the sleeping state and the working state on the basis of the determined difference, wherein when the difference between the remaining battery capacity of the neighbor state and the battery capacity of the node in the probing state is greater than or equal to a threshold value transitioning to the work state and sending a sleep message to the associated neighbor node, said sleep message including the determined sleep time.

2. The method of claim 1 wherein when the difference between the remaining battery capacity of the neighbor node associated with the reply message and the battery capacity of the node in the probing state is less than the threshold value, the node in the probing state makes a transition to the sleeping state for the determined sleep time.

3. The method of claim 1, wherein the node in the probing state transitions to the working state when no reply message is received after a preset time duration.

4. The method of claim 1, wherein making a state transition comprises:
making, upon reception of a sleep message in response to the reply message, a transition to the sleeping state.

5. The method of claim 1, further comprising transitioning, by a node in the sleeping state, to the probing state after said sleep time expires.

6. The method of claim 1, wherein the nodes have overlapping sensing ranges and transmission ranges.

7. A wireless sensor network comprising:
a plurality of nodes transitioning between a sleeping state, probing state, and working state, wherein:
a node, comprising a processor for executing instructions stored in a memory, in a probing state, in response to a reply message received from an neighbor node, extracts a battery capacity value from the reply message;
determines a difference between the extracted battery capacity value and a battery capacity associated with the node in the probing state;
determining a sleep time corresponding to a product of the difference of said extracted battery value and a battery capacity, associated with the node in the probing state and a preset value; and
transitions to a working wake state when the difference between the extracted battery capacity value and the battery capacity associated with the node in the probing state is greater than a threshold value and sending a sleep message to the associated neighbor node, said sleep message including the determined sleep time.

8. The wireless sensor network of claim 7, wherein a node in the probing state sends a probe message requesting a response to neighbor nodes.

9. The wireless sensor network of claim 7, wherein when the difference between the extracted battery capacity value and the battery capacity associated with the node in the probing state is less than the threshold value, the node in the probing state transitions to the sleeping state for the determined sleep time.

10. The wireless sensor network of claim 7, wherein the node in the probing state makes a transition to the working state when no reply message is received after a preset time duration.

11. The wireless sensor network of claim 7, wherein in response to a probe message, a node in a working state sends a reply message containing data on a remaining battery capacity of the node.

12. The wireless sensor network of claim 11, wherein in response to a sleep message, a node in a working state transitions to the sleeping state.

13. The wireless sensor network of claim 7, wherein a node in a sleeping state makes a transition to the probing state after a sleep time expires.

14. The wireless sensor network of claim 7, wherein the nodes have overlapping sensing ranges and transmission ranges.

15. A sensor node comprising:
a transceiving unit; and
a processor in communication with said transceiving unit and a memory, said memory including code, which when accessed by the processor causes the processor to:
transmit, through the transceiving unit, a probe message:
receive at least one reply message responsive to said probe message from a plurality of nodes, said reply message including a remaining battery content value of a corresponding node;
determine a difference of said remaining battery content value included in each of said at least one reply message and a remaining battery content value of said sensor node;
determining a sleep time corresponding to a product of the difference between the remaining battery content value of the corresponding node and the remaining battery content value of the sensor node and a preset value;
transmit, through the transceiving unit, a sleep message to each of said plurality of nodes when a corresponding difference in remaining battery capacity is greater than or equal to a known threshold, said sleep message including the determined sleep time;
transitioning to a working state if each difference in remaining battery capacity is greater than or equal to said known threshold and transitioning to a sleeping state, after sending all sleep message, if at least one difference is less than said known threshold.

16. The sensor unit of claim 15, wherein said sensing node remains in the sleeping state for the determined sleep time.

17. The sensor unit of claim 15, wherein in response to a sleep message, said processor executes code to:
extract the sleep time from said sleep message; and
transition to the sleeping state for a period corresponding to said sleep time.

* * * * *